(12) United States Patent
Gao et al.

(10) Patent No.: US 12,186,921 B2
(45) Date of Patent: Jan. 7, 2025

(54) ROBOTIC SYSTEM FOR FREE-FORMING A WORKPIECE

(71) Applicant: GM GLOBAL TECHNOLOGY OPERATIONS LLC, Detroit, MI (US)

(72) Inventors: Dalong Gao, Rochester, MI (US); Xiang Zhao, Novi, MI (US); Chris A. Ihrke, Hartland, MI (US); Hui-ping Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 18/078,717

(22) Filed: Dec. 9, 2022

(65) Prior Publication Data
US 2024/0190010 A1 Jun. 13, 2024

(51) Int. Cl.
| | |
|---|---|
| *B25J 11/00* | (2006.01) |
| *B25J 9/00* | (2006.01) |
| *B25J 9/16* | (2006.01) |
| *B25J 13/08* | (2006.01) |
| *B25J 15/00* | (2006.01) |
| *B25J 15/06* | (2006.01) |

(52) U.S. Cl.
CPC ............ *B25J 9/1697* (2013.01); *B25J 9/0084* (2013.01); *B25J 11/005* (2013.01); *B25J 13/085* (2013.01);
(Continued)

(58) Field of Classification Search
CPC ...... B25J 13/085; B25J 9/0084; B25J 9/1697; B25J 11/005; B25J 15/0616;
(Continued)

(56) References Cited

U.S. PATENT DOCUMENTS

| | | | |
|---|---|---|---|
| 11,660,698 B2 * | 5/2023 | Knoener | G06F 3/04847 219/130.21 |
| 11,685,004 B2 * | 6/2023 | Prochnow | B23K 10/00 324/511 |

(Continued)

FOREIGN PATENT DOCUMENTS

| | | |
|---|---|---|
| AT | 521039 B1 | 10/2019 |
| DE | 2742226 A1 | 3/1979 |

(Continued)

OTHER PUBLICATIONS

Pini et al., Offline workpiece calibration method for robotic reconfigurable machining platform, 2014, IEEE, p. 1-8 (Year: 2014).*

(Continued)

*Primary Examiner* — Mcdieunel Marc (57) ABSTRACT

A robotic system for forming a moldable workpiece is provided. The robotic system includes a robot, an end effector, an adjustment module, and a control module. The robot is configured to pass the workpiece through a machine. The end effector is configured to be attached to the robot and configured to grasp and release the workpiece. The end effector is adjustable to a plurality of different configurations. The adjustment module is configured to determine a change in the workpiece from (a) a first form of the workpiece prior to the passing of the workpiece through the machine to (b) a second form of the workpiece after passing of the workpiece through the machine. The control module is configured to adjust a present configuration of the end effector to a second configuration based on the change in the workpiece from (a) the first form to (b) the second form.

20 Claims, 5 Drawing Sheets

(52) U.S. Cl.
CPC ....... *B25J 15/0028* (2013.01); *B25J 15/0616* (2013.01)

(58) Field of Classification Search
CPC .......................... B25J 15/0019; B25J 15/0028; B25J 15/0683; B25J 9/1682; B25J 9/0009; B25J 11/0055; B25J 9/0069; G05B 19/41825; G05B 2219/39157; G05B 2219/45145; G05B 2219/39105; G05B 2219/39156; B23Q 1/035; B23Q 1/58; B23Q 1/037; B23Q 1/5462; B23Q 1/0045; B23Q 11/0891; Y02P 90/02
See application file for complete search history.

(56) References Cited

U.S. PATENT DOCUMENTS

| | | | |
|---|---|---|---|
| 12,053,947 B2* | 8/2024 | Dubois | B29D 30/3057 |
| 2021/0268595 A1* | 9/2021 | Ihde | B23K 9/1062 |
| 2023/0060789 A1* | 3/2023 | Durik | B23K 9/1062 |
| 2024/0253214 A1* | 8/2024 | Diankov | B25J 19/023 |

FOREIGN PATENT DOCUMENTS

| | | |
|---|---|---|
| DE | 202014103132 U1 | 10/2015 |
| DE | 102013202571 B4 | 5/2016 |
| DE | 102016224377 A1 | 6/2018 |
| DE | 102021111279 A1 | 5/2022 |

OTHER PUBLICATIONS

Yan et al., Design of Industrial Robot Sorting System Based on Smart Camera, 2019, IEEE, p. 652-655 (Year: 2019).*

Spiller et al., Superimposed Force/Torque-Control of Cooperating Robots, 2010, IEEE, p. 531-537 (Year: 2010).*

Reinhart et al., A generic framework for workpiece-based programming of cooperating industrial robots, 2009, IEEE, p. 37-42 (Year: 2009).*

U.S. Appl. No. 17/810,723, filed Jul. 5, 2022, Solomon et al.

German Office Action for German Application No. 10 2023 122 799.8 dated Oct. 1, 2024.

* cited by examiner

ROBOTIC SYSTEM FOR FREE-FORMING A WORKPIECE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle manufacturing and more particularly to a robotic system for free-forming a workpiece of a vehicle.

Various different types of materials, such as aluminum, steel, plastic, etc. are collected for manufacturing of vehicles. Some components of vehicles are formed from sheet metal. Examples of such components of vehicles include frames, doors, hoods, roofs, trunk lids, etc.

In a vehicle manufacturing plant, robots and other types of shaping machinery may assist in forming the components.

SUMMARY

A robotic system for forming a moldable workpiece includes a robot, an end effector, an adjustment module, and a control module. The robot is configured to pass the workpiece through a machine. The end effector is configured to be attached to the robot and configured to grasp and release the workpiece. The end effector is adjustable to a plurality of different configurations. The adjustment module is configured to determine a change in the workpiece from (a) a first form of the workpiece prior to the passing of the workpiece through the machine to (b) a second form of the workpiece after passing of the workpiece through the machine. The control module is configured to adjust a present configuration of the end effector to a second configuration based on the change in the workpiece from (a) the first form to (b) the second form.

In one example, a camera is configured to capture (a) a first image of the workpiece prior to the passing of the workpiece through the machine and (b) a second image of the workpiece after the passing of the workpiece through the machine. The adjustment module is configured to determine the first form of the workpiece based on the first image and to determine the second form of the workpiece based on the second image.

In one example, at least one camera is configured to capture an image of the workpiece while the workpiece is being passed through the machine. The adjustment module is configured to determine a present form of the workpiece based on the image. The control module is configured to adjust the present configuration of the end effector based on the present form of the workpiece and while the workpiece is being passed through the machine.

In one example, the end effector includes a force sensor configured to measure (a) a first force applied by the end effector to the workpiece prior to the passing of the workpiece through the machine and (b) a second force applied by the end effector to the workpiece after the passing of the workpiece through the machine. The adjustment module is configured to determine the first form based on the first force and to determine the second form based on the second force.

In one example, the end effector includes a force sensor that is configured to measure a force applied by the end effector to the workpiece as the workpiece is passed through the machine. The adjustment module is configured to determine a present form of the workpiece based on the force. The control module is configured to adjust the present configuration of the end effector based on the present form of the workpiece while the workpiece is passed through the machine.

In one example, the end effector includes a support portion, and an attachment device that is attached to the support portion and configured to grasp and release the workpiece. The control module is configured to adjust the present configuration of the end effector by adjusting the attachment device.

In one example, the control module is configured to move the attachment device in at least one of an X direction, a Y direction, and a Z direction, and the X, Y and Z directions are perpendicular to each other.

In one example, the control module is configured to rotate the attachment device about at least one of an X axis, a Y axis, and a Z axis, and the X, Y and Z axes are perpendicular to each other.

In one example, the attachment device includes a first attachment device that is movable relative to the support portion of the end effector, and the end effector further includes and a second attachment device that is fixed to the support portion.

In one example, the machine is at least one of an English wheel and a power hammer.

In one example, the robotic system further includes a second robot, and a second end effector. The second end effector is configured to be attached to the second robot and configured to grasp and release the workpiece. The end effector and the second end effector grasp opposing ends of the workpiece.

An example robotic system for forming a moldable workpiece includes a robot, an end effector, a camera, a first adjustment module, and a control module. The robot is configured to pass the workpiece through a machine. The end effector includes a support portion and an attachment device that is attached to the support portion. The attachment device is configured to grasp and release the workpiece and is adjustable to a plurality of configurations. The camera is configured to capture (a) a first image of the workpiece prior to the passing of the workpiece through the machine and (b) a second image of the workpiece after the passing of workpiece through the machine. The first adjustment module is configured to determine a change in the workpiece from (a) a first form prior to the passing of the workpiece through the machine to (b) a second form of the workpiece after passing of the workpiece through the machine using the first image and the second image. The control module is configured to adjust a present configuration of the attachment device to a second configuration based on the change in the workpiece from (a) the first form to (b) the second form.

In one example, the end effector includes a rail fixedly attached to the support portion and the attachment device is movable along the rail.

In one example, the attachment device is a suction cup that is spring-loaded.

In one example, the attachment device includes a housing and a pair of fingers that extend from the housing. The control module is configured to actuate the pair of fingers and grasp and release the workpiece.

In one example, the control module is configured to actuate the attachment device to release the workpiece after the passing of the workpiece through the machine and configured to re-grasp the workpiece prior to a subsequent passing of the workpiece through the machine.

In one example, the robotic system further includes a second adjustment module. The end effector includes a force sensor configured to measure (a) a first force applied by the attachment device to the workpiece prior to the passing of the workpiece through the machine and (b) a second force applied by the attachment device to the workpiece after the passing of the workpiece through the machine. The second adjustment module is configured to determine the first form based on the first force and to determine the second form based on the second force.

In one example, the second adjustment module is configured to determine a second change in the workpiece from (a) the first form to (b) the second form. The control module is configured to adjust the present configuration of the attachment device based on at least one of the change and the second change in the workpiece.

In one example, the robotic system further includes a second robot and a second end effector. The second end effector is configured to be attached to the second robot and configured to grasp and release the workpiece. The end effector and the second end effector grasp opposing ends of the workpiece.

A robotic system method for forming a moldable workpiece is provided. The method includes capturing a first image of a workpiece prior to passing of the workpiece through a machine. The method includes determining a first form of the workpiece prior to the passing of the workpiece through the machine based on the first image. The method includes passing the workpiece through the machine using an end effector. The method includes capturing a second image of the workpiece after the passing of the workpiece through the machine. The method includes determining a second form of the workpiece after passing of the workpiece through the machine based on the second image. The method includes determining a change in the workpiece from (a) the first form to (b) the second form. The method includes adjusting a present configuration of the end effector to a second configuration based on the change in the workpiece from (a) the first form to (b) the second form.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Stamping machines can be used to stamp and shape material into components of vehicles for vehicle manufacturing.

The present application involves a robotic system for free-forming workpieces for vehicle manufacture. One or more robots may each be attachable to an end effector. The end effector is adjustable to a plurality of configurations. The end effectors are configured to grasp and release a workpiece.

The workpiece is moldable to a plurality of forms. The robots may pass the workpiece through a machine (e.g., power hammer, English wheel, etc.) one or more times to change the form/shape of the workpiece. For example, the workpiece is changed from a first form prior to passing the workpiece through the machine to a second form after the workpiece is passed through the machine. The workpiece is repeatedly passed through the machine until the workpiece is molded into a target form. In one example, the target form of the workpiece may be the form of a class A vehicle panel of a low-volume vehicle. However, the target form of the workpiece may be the form of another component and/or of another type of vehicle. The present application is also applicable to non-vehicle components.

As the form of the workpiece is changed from the first form to the second form, the configuration of the end effector may not be suitable to grasp the second form of the workpiece. For example, the end effector may not be able to grasp the workpiece without unintentionally deforming the workpiece. Additionally, a location of where the end effector grasps the workpiece may interfere with an area of the workpiece that is to be re-shaped during a subsequent pass through the machine.

In view of the above, the robotic system identifies the change in form of the workpiece and automatically adjusts the configuration of the end effector accordingly.

Figure 1:
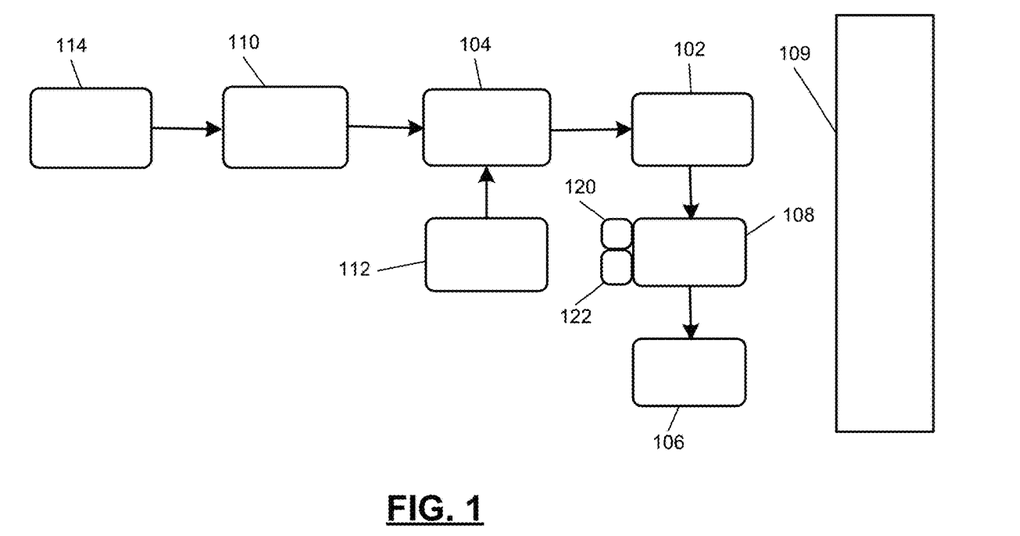
FIG. 1 is a functional block diagram of an example robotic system.

FIG. 1 is a functional block diagram of an example robotic system 100. The robotic system 100 may be disposed within a vehicle manufacturing plant of a vehicle original equipment manufacturer (OEM). The robotic system 100 may include one or more robots 102 and a control module 104 configured to control movement and operation of the one or more robots 102.

The robots 102 are configured to grasp and move a workpiece 106 within the vehicle manufacturing plant. Each robot 102 is attachable to an end effector 108. The end effector 108 is configured to grasp and release the workpiece 106. While grasping the workpiece 106, the robots 102 are configured to pass the workpiece 106 through a machine 109 one or more times to adjust the workpiece 106 into a target form.

The machine 109 may be an English wheel, a power hammer, or another type of machine. The machine 109 may physically change the shape/form of the workpiece 106 when the workpiece 106 is within the machine 109. For example, the workpiece 106 may be in a first form prior to passing (a portion or all of the workpiece 106) through the machine 109 and in a second form after passing through the machine 109. The form of the workpiece 106 may include a shape of the workpiece 106, a size of the workpiece 106, and/or one or more other physical characteristics of the workpiece 106. In one example, the first form may be the form of a flat sheet metal and the second form may be the non-flat form of a desired vehicle component.

The robotic system 100 may include a first adjustment module 110, a second adjustment module 112, or both the first and second adjustment modules 110, 112.

The first adjustment module 110 is a vision-based module. One or more cameras 114 are positioned within the vehicle manufacturing plant and configured to capture images of the workpiece 106. In one example, a first camera may be disposed on a first side of the workpiece 106 and a second camera may be disposed on a second side of the workpiece 106. The first and second cameras may be positioned opposite from each other, perpendicular from each other, or any other suitable positioning from each other.

The cameras 114 are configured to capture images including the workpiece 106 when the workpiece 106 is within the fields of view of the cameras 114. The cameras 114 are configured to capture images of the workpiece 106 from a first time prior to the workpiece 106 passing through the machine 109 to a second time after the workpiece 106 has passed through the machine 109. The cameras 114 may transmit the images to the first adjustment module 110 by wire or wirelessly as or after the images are captured.

The first adjustment module 110 determines a present form of the workpiece 106 using one or more present (e.g., most recently received) ones of the images from the cameras 114. The first adjustment module 110 may transmit the present form of the workpiece 106 to the control module 104 by wire or wirelessly.

Additionally, the cameras 114 are configured to capture first images prior to the workpiece 106 passing through the machine 109 and second images after the workpiece 106 is passed through the machine 109. The first adjustment module 110 is configured to determine the first form of the workpiece 106 using at least one of the first images and to determine the second form of the workpiece 106 using at least one of the second images.

The first adjustment module 110 is configured to determine a first change in the workpiece 106 from the first form (e.g., prior to the workpiece 106 passing through the machine 109) to the second form (e.g., after the workpiece 106 is passed through the machine 109) based on at least of the first images and at least one of the second images. The first adjustment module 110 may transmit the first change in the workpiece 106 to the control module 104 by wire or wirelessly.

In one example, one or more identifiers are disposed on the workpiece 106. Examples of identifiers include fiducials (e.g., reflective), quick response (QR) codes, markers, or another suitable type of visual identifier. The cameras 114 are configured to capture the images of the identifiers on the workpiece 106. Using at least one of the first images, the first adjustment module 110 is configured to determine a first one or more locations of the identifiers, respectively, and the first form of the workpiece 106. Using at least one of the second images, the first adjustment module 110 is configured to determine a second one or more locations of the identifiers, respectively, and the second form of the workpiece 106. The first adjustment module 110 is configured to determine the first change in the workpiece 106 from the first form to the second form based on a change in the first one or more locations and second one or more locations of the identifiers, respectively.

In another example, the workpiece 106 may be painted and include a pattern in the paint. Using at least one of the first images, the first adjustment module 110 is configured to determine a first pattern of the paint and to determine the first form of the workpiece 106 based on the first pattern of the paint. Using at least one of the second images, the first adjustment module 110 is configured to determine a second pattern of the paint and to determine the second form of the workpiece 106 based on the second pattern of the paint. The first adjustment module 110 is configured to determine the first change in the workpiece 106 based on a change between the first and second patterns.

The second adjustment module 112 is a force-based module. One or more force sensors 120 are disposed on the end effector 108. More specifically, the end effector 108 includes at least one attachment device 122 that is configured to grasp and hold the workpiece 106 while the workpiece 106 is passed through the machine 109. The at least one attachment device 122 applies a force onto the workpiece 106 in order to grasp and hold the workpiece 106. The force sensors 120 may be disposed on a contact surface of the at least one attachment device 122. The force sensors 120 are configured to measure the force on the attachment device 122 (e.g., the contact surface) between the attachment device 122 and the workpiece 106. In one example, the force sensors 120 are configured to measure the force on the attachment device 122 by measuring a strain of the attachment device 122.

The force sensors 120 are configured to measure the forces throughout the forming process including from the first time prior to the workpiece 106 passing through the machine 109 to the second time after the workpiece 106 has passed through the machine 109. The force sensors 120 may transmit the force measurements to the second adjustment module 112 by wire or wireless as or after the force is measured.

The second adjustment module 112 is configured to determine the present form of the workpiece 106 using at least one of the forces received from the force sensors 120. More specifically, the second adjustment module 112 is configured to determine a material stretch in the workpiece 106 based on the at least one of the forces and to determine the present form of the workpiece 106 based on the material stretch. The second adjustment module 112 may transmit the present form of the workpiece 106 to the control module 104 by wire or wirelessly.

Additionally, the force sensors 120 are configured to capture first forces prior to the workpiece 106 passing through the machine 109 and second forces after the workpiece 106 has passed through the machine. The second adjustment module 112 is configured to determine the first form of the workpiece 106 using at least one of the first forces (prior to the passing through the machine 109) and the second form of the workpiece 106 using at least one of the second forces (after the passing through the machine 109).

The second adjustment module 112 is configured to determine a second change in the workpiece 106 based on a change between at least one of the first forces and at least one of the second forces. For example, a larger change in forces may correspond to the workpiece 106 undergoing a greater deformation or stretch. A smaller change in forces may correspond to the workpiece 106 undergoing a smaller deformation or stretch. The second adjustment module 112 may transmit the second change in the workpiece 106 to the control module 104 by wire or wirelessly.

The control module 104 is configured to control actuation and movement of the robots 102. Based on the second form of the workpiece 106 (the form of the workpiece 106 after passing through the machine 109), the control module 104 is configured to determine whether the workpiece 106 has changed to (or is in) the target form. For example, the control module 104 may compare the second form of the workpiece 106 against predetermined computer aided design (CAD) models.

If the second form of the workpiece 106 is substantially the same as the target form, forming of the workpiece 106 may be deemed complete and the workpiece 106 may not be passed through the machine 109 again. If the second form of the workpiece 106 is not substantially the same as the target form, the control module 104 is configured to control the robot(s) 102 and pass the workpiece 106 through the machine 109 a subsequent time. Substantially the same may mean within one or more predetermined tolerances. If the second form of the workpiece 106 is not substantially the same as the target form, the control module 104 is configured to determine a path to pass the workpiece 106 through the machine 109 and a location for the at least one attachment device 122 to grasp the workpiece 106 based on at least one of the second form of the workpiece 106, the first or second change in the workpiece 106, and the target form of the workpiece 106. The path may include the angle in which the workpiece 106 is positioned, the speed in which the workpiece 106 is passed through the machine 109, and/or one or more other parameters for passing the workpiece 106 through the machine 109. The control module 104 controls the robot(s) 102 to pass the workpiece 106 through the machine 109 according to the determine parameter(s).

Additionally, if the second form of the workpiece 106 is not substantially the same as the target form, the control module 104 is configured to determine a configuration of the end effector 108 for the passing through the machine 109. The control module 104 is configured to adjust the configuration of the end effector 108 as the workpiece 106 is being passed through the machine 109 based on the present form of the workpiece 106. Additionally, the control module 104 is configured to adjust the configuration of the end effector 108 after the workpiece 106 has passed through the machine 109 based on at least one of the first and second changes in the workpiece 106. Adjusting the configuration of the end effector 108 includes adjusting (e.g., a position and/or orientation of) the at least one attachment device 122 of the end effector 108.

For example, the first configuration may be a configuration of the end effector 108 for when the workpiece 106 is in the first form. The second configuration may be a configuration of the end effector 108 for when the workpiece 106 is in the second form.

Figure 2:
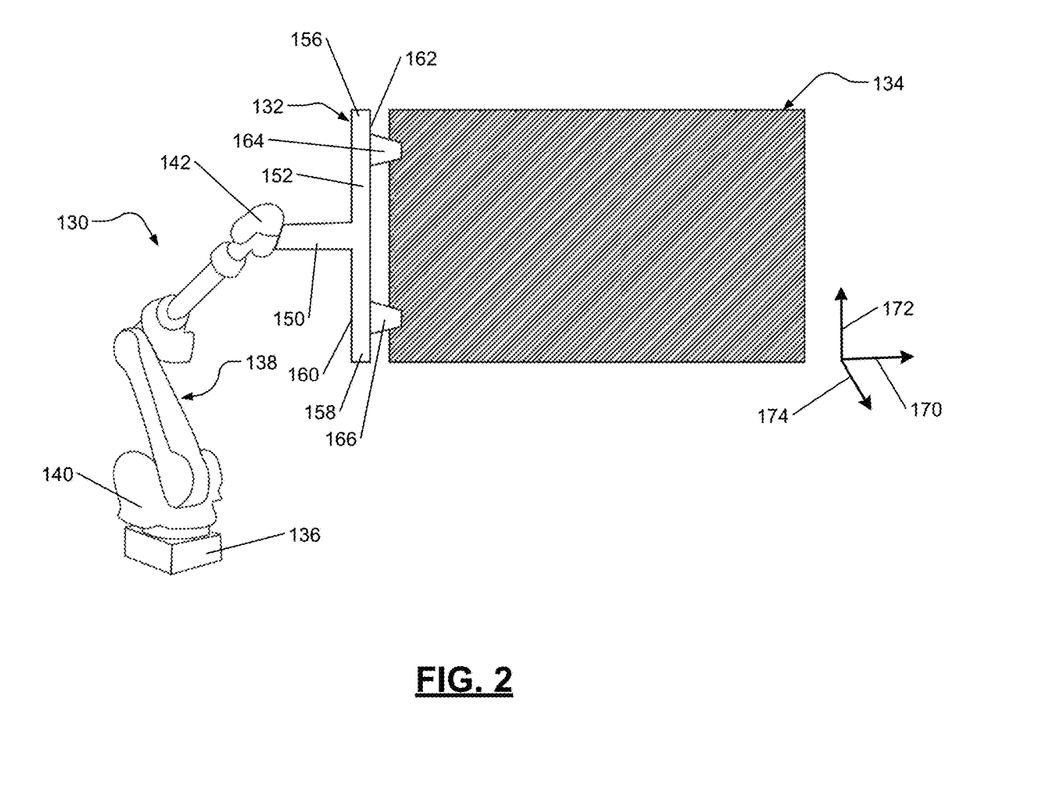
FIG. 2 is a perspective view of an example robot and an example end effector grasping an example workpiece.
Figure 3:
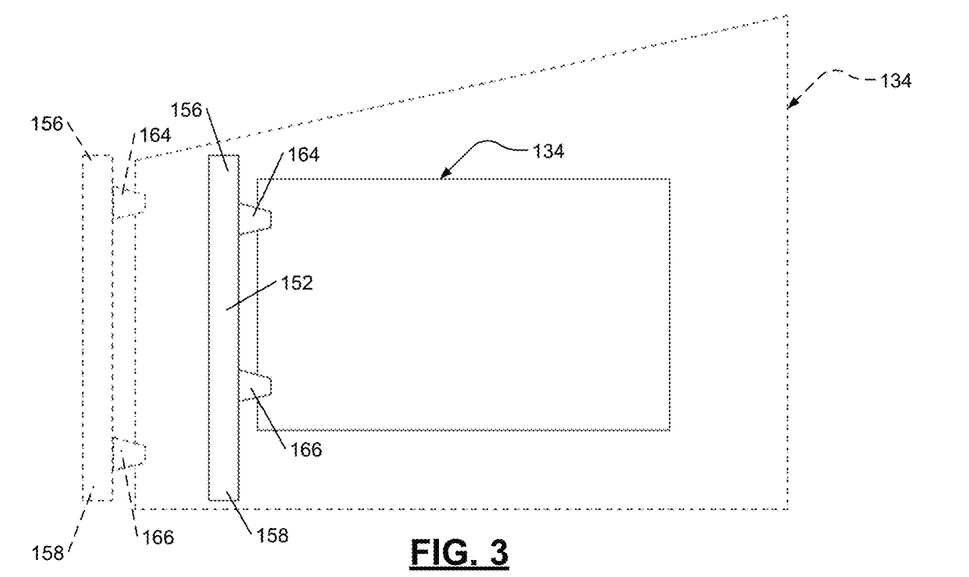
FIG. 3 is a partial side view of the example end effector grasping the workpiece when the workpiece is in a first form and grasping the workpiece when the workpiece is in a second form.

FIG. 2 is a perspective view of an example robot 130 and an example end effector 132 grasping an example workpiece 134. FIG. 3 is a partial side view of the end effector 132 in a first configuration grasping the workpiece 134 while the workpiece 134 is in an example first form and the end effector 132 in a second configuration grasping the workpiece 134 while the workpiece 134 is in an example second form.

As shown in FIG. 2, the example robot 130 may include a base 136 and a robot arm 138. The base 136 may be positioned on a floor surface of the vehicle manufacturing plant, or alternatively on a stand. The robot arm 138 extends between a first end 140 and a second end 142 that is opposite the first end. The first end 140 of the robot arm 138 may be attached to the base 136. In the illustrated example, the robot 130 may be a 6 degrees of freedom (DOF) robot. However, any suitable robot 130 may be used, such as a 3 DOF or higher robot.

As illustrated in FIG. 2, the second end 142 of the robot arm 138 may be attached to the end effector 132 and configured to move the end effector 132.

In some configurations, the second end 142 of the robot arm 138 may be disconnectable from the end effector 132 and attachable to a reconfiguration tool. The reconfiguration tool may be configured to adjust one or more components of the end effector 132 and may be disconnectable from the reconfiguration tool after adjusting the end effector 132 to a target configuration. The reconfiguration tool may be a pneumatic torque wrench or another type of reconfiguration tool. Alternatively, the control module 104 may adjust the configuration of the end effector 132 by transmitting a command to the end effector 132 and without a reconfiguration tool.

The end effector 132 may include a connector 150 and a support portion 152. The connector 150 extends from the support portion 152 and is attachable to the second end 142 of the robot arm 138. The support portion 152 extends between a third end 156 and a fourth end 158 that is opposite the third end 156, and includes a first side 160 and a second side 162 that is opposite the first side 160. In the illustrated example, the connector 150 is disposed approximately perpendicular to the support portion 152 and extends from the first side 160 of the support portion 152. The connector 150 may be disposed equidistantly between the third and fourth ends 156, 158 of the support portion 152. However, the connector 150 may be disposed at any suitable angle relative to the support portion 152 and may be positioned in any suitable position between the third and fourth ends 156, 158 of the support portion 152.

Additionally, the end effector 132 may include one or more attachment devices that are movably attached to the support portion 152. In the illustrated example, the one or more attachment devices includes a first attachment device 164 and a second attachment device 166. The first and second attachment devices 164, 166 are disposed on the second side 162 of the support portion 152. The first attachment device 164 is disposed near the third end 156 of the base 136. The second attachment device 166 is disposed near the fourth end 158 of the base 136. However, the end effector 132 may include a greater or lesser number of attachment devices.

The first and second attachment devices 164, 166 are configured to grasp and release the workpiece 134. In one example, the workpiece 134 may be pre-stressed when the workpiece 134 is grasped. The first and second attachment devices 164, 166 may grasp the workpiece 134 prior to the workpiece 134 passing through the machine 109 and release the workpiece 134 after the workpiece 134 is passed through the machine 109.

Additionally, the first and second attachment devices 164, 166 may be actuated to hold the workpiece 134 pneumatically or in another suitable manner. For example, the robot 130 may draw air from within the first and second attachment devices 164, 166 to hold the workpiece 106 to the first and second attachment devices 164, 166.

The configuration of the end effector 132 may be adjusted by adjusting at least one of the first attachment device 164 and the second attachment device 166, relative to the support portion 152. In one example, the first attachment device 164 may be movable and the second attachment device 166 may be stationary. In another example, the second attachment device 166 may be movable and the first attachment device 164 may be stationary. In yet another example, the first and second attachment devices 164, 166 may both be movable.

The first and/or second attachment devices 164, 166 may be movable along an X axis 170, a Y axis 172, a Z axis 174, or a combination thereof, relative to the support portion 152 of the end effector 132. Additionally, the first and/or second attachment device 164, 166 may be rotatable about the X axis 170, the Y axis 172, the Z axis 174, or a combination thereof. For example, the first attachment device may be movable along the X and Y axes 170, 172 and rotatable about the X, Y, and Z axes 170, 172, 174, and the second attachment device 166 may be stationary.

Movement along the X axis 170 is represented by movement into and out of the support portion 152 of the end effector 132. Movement along the Y axis 172 is represented by slidable movement along the support portion 152 of the end effector 132. More specifically, the first attachment device 164 may be slidable relative to the support portion 152 between the third end 156 of the support portion 152 and the second attachment device 166. The second attachment device 166 may be slidable relative to the support portion 152 between the first attachment device 164 and the fourth end 158 of the support portion 152. Movement along the Z axis 174 is represented by movement perpendicular to both the X and Y axes 170, 172.

In FIG. 3, an example first form of the workpiece 134 is illustrated using a solid line and an example second form of the workpiece 134 is illustrated using a dotted line. The first form is illustrated as a rectangular shape. The second form is illustrated as a trapezoidal shape. The second form of the workpiece is notably larger in size than the first form. However, the first and second forms may be another shape and/or size. The second form may be planar or non-planar.

Based on the first and second forms of the workpiece 134, the positioning of the first and second attachment devices 164, 166 of the end effector 132 is adjusted by the control module 104 to accommodate the change in form. In FIG. 3, the first attachment device 164 is adjusted closer to the third end 156 of the support portion 152 when the workpiece 134 is in the second form relative to when the workpiece 134 is in the first form. The second attachment device 166 is adjusted closer to the fourth end 158 of the support portion 152 when the workpiece 134 is in the second form relative to when the workpiece 134 is in the first form. Accordingly, the first and second attachment devices 164, 166 are adjusted to accommodate the larger size of the second form.

Figure 4:
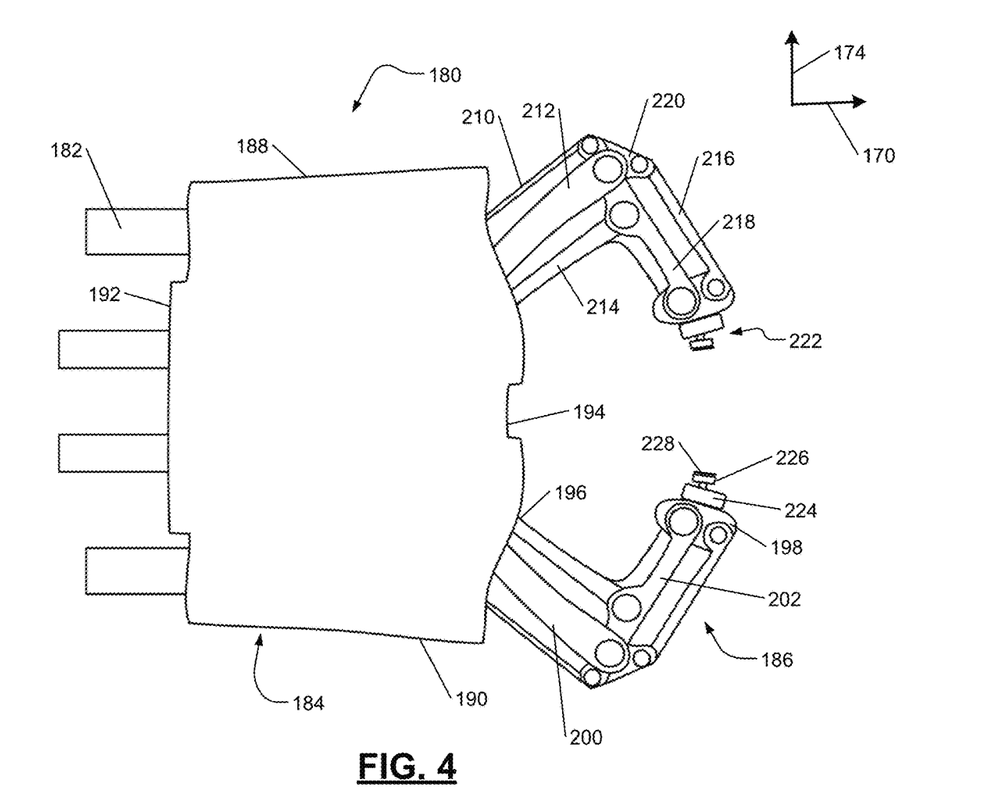
FIG. 4 is a top view of an example attachment device of the end effector shown in FIGS. 2-3.

FIG. 4 is a top view of another attachment device 180. In some configurations of the end effector 132, the first and second attachment devices 164, 166 of the end effector 132 may be achieved by the attachment device 180.

The attachment device 180 includes motors 182, a housing 184, and fingers 186. The motors 182 may be received within the support portion 152 of the end effector 132 and the housing 184 of the attachment device 180 at opposing ends. The motors 182 may be servo motors, or any other suitable motors. In the illustrated example, four motors 182 are shown. However, a greater or lesser number of motors 182 may be provided.

The housing 184 may include a fifth end 188 and a sixth end 190 that is opposite the fifth end 188. Additionally, the housing 184 may have a third side 192 and a fourth side 194 that is opposite the third side 192. The motors 182 may be attached to the third side 192 of the housing 184 and the pair of fingers 186 may extend from the fourth side 194 of the housing 184. However, the pair of fingers 186 may be attached to any suitable location on the housing 184.

Each of the fingers 186 may include a seventh end 196 and an eighth end 198 that is opposite the seventh end 196. The seventh ends 196 of the fingers 186 are positioned adjacent (e.g., proximal) to the housing 184. The eighth ends 198 of the fingers 186 are positioned distal to the housing 184. Additionally, each of the fingers 186 may include a first set of linkages 200 and a second set of linkages 202. The first set of linkages 200 may extend from the housing 184. The second set of linkages 202 are rotatably attached to the first set of linkages 200.

In the illustrated example, the first set of linkages 200 may include a first link 210, a second link 212, and a third link 214. The first, second and third links 210, 212, 214 may extend longitudinally and may be spaced apart from each other such that the second link 212 is disposed between the first and third links 210, 214. The second set of linkages 202 may include a fourth link 216 and a fifth link 218. The fourth and fifth links 216, 218 may extend longitudinally and may be spaced from each other such that the fifth link 218 is disposed inboard of the fourth link 216. A connector link 220 may be disposed between the first and fourth link 210, 216 such the first and fourth links 210, 216 are rotatably attached to opposing ends of the connector link 220. The second link 212 may be rotatably attached to the fifth link 218 at the connector link 220. The third link 214 may be rotatably attached to the fifth link 218.

A gripper assembly 222 may be disposed at the eighth end 198 of each of the fingers 186. The gripper assembly 222 may include a gripper base 224 that is fixedly attached to the second set of linkages 202 and a gripper 226 that is pivotally attached to the gripper base 224.

The workpiece 134 may be disposed between the grippers 226 of the fingers 186. The first and second sets of linkages 200, 202 of the fingers 186 are configured to rotate to grasp and release the workpiece 134. For example, the fingers 186 may rotate inward to clench the workpiece 134 and may rotate outward to release the workpiece 134. Additionally, each gripper 226 is configured to pivot relative the gripper base 224 in order to grasp the workpiece 134 at a suitable angle.

In some examples, such as when the robotic system 100 includes the second adjustment module 112, an example force sensor 228 may be disposed at a contact surface of the gripper 226. The force sensor 228 is configured to measure a force that is applied by the gripper 226 onto the workpiece 134 as the gripper 226 grasps the workpiece 134.

The fingers 186 may be movable relative to the housing 184. In one example, the fingers 186 may be movable along the X axis 170 and the Z axis 174 and may be rotatable about the X axis 170 and the Y axis 172. Movement of the fingers 186 along the X axis 170 is represented by movement into and out of the housing 184. Movement of the fingers along the Z axis 174 is represented by movement along the fourth side 194 of the housing 184 between the fifth and sixth ends 188, 190 of the housing 184. Each of the fingers 186 may move independently, or alternatively the fingers 186 may move together in concert.

Figure 5:
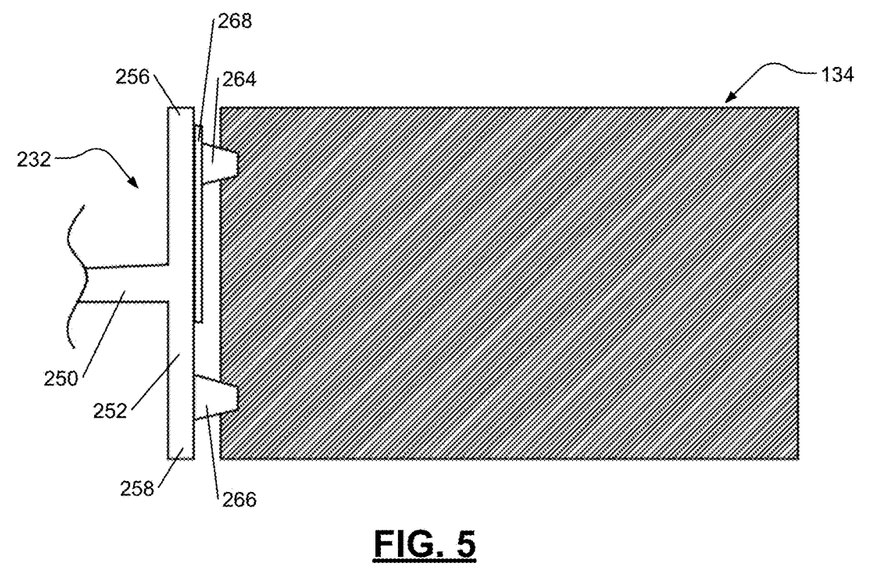
FIG. 5 is a side view of another example end effector grasping the workpiece.
Figure 6:
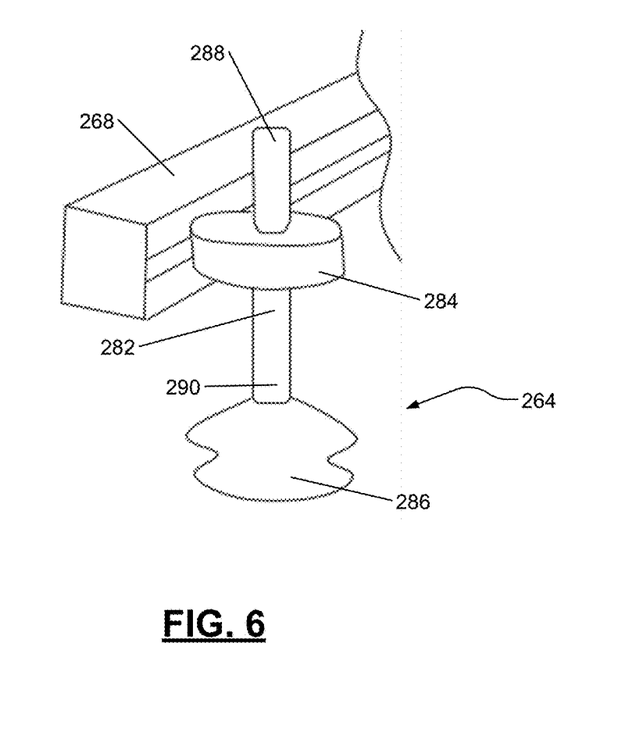
FIG. 6 is a partial perspective view of an example attachment device of the end effector shown in FIG. 5.
Figure 7:
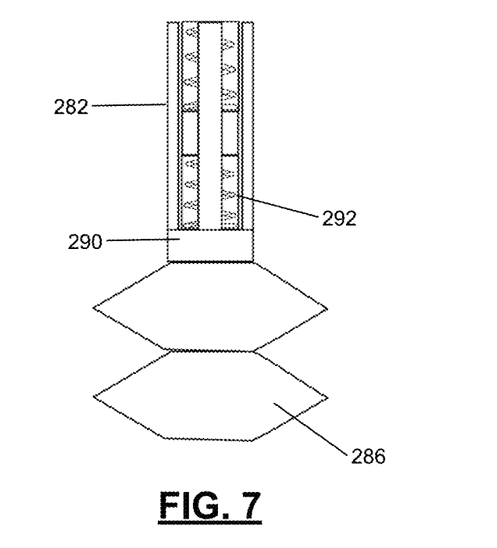
FIG. 7 is a partial cross-sectional view of the example attachment device shown in FIG. 6.

Another example end effector 232 is illustrated in FIGS. 5-7. FIG. 5 is a side view of the end effector 232 grasping the workpiece 134. FIG. 6 is a partial perspective view of an example first attachment device 264 of the end effector 232. FIG. 7 is a partial cross-sectional view of the first attachment device 264.

The end effector 232 may include a connector 250 and a support portion 252 extending between a third end 256 and a fourth end 258. The connector 250 and the support portion 252 of end effector 232 may be the same or substantially similar to the connector 150 and the support portion 152 of end effector 132. Accordingly, these components will not be re-described in detail.

Additionally, the end effector 232 may include the first attachment device 264 and a second attachment device 266.

The end effector 232 may also include a rail 268 that is attached to the support portion 252. The first attachment device 264, the second attachment device 266 or both the first and second attachment devices 264, 266 may be slidable along the rail 268. In the illustrated example, the rail 268 is disposed between the third end 256 of the support portion 252 and the second attachment device 266. The first attachment device 264 is slidable along the rail 268. In some configurations, a second rail may be disposed between the rail 268 and the fourth end 258 of the support portion 252. The second attachment device 266 may be slidable along the second rail.

In one example, the first attachment device 264, the second attachment device 266, or both the first and second attachment devices 264, 266 may be the same or substantially similar to the attachment device 180.

In the illustrated example shown in FIGS. 6-7, the first attachment device 264 includes a rod 282, a receiver 284 and a suction cup 286. The rod 282 extends between a fifth end 288 and a sixth end 290 that is opposite the fifth end 288. The rod 282 extends through the receiver 284 such that the receiver 284 is disposed between the fifth and sixth ends 288, 290 of the rod 282. The receiver 284 is coupled to the rail 268 and moves the first attachment device 264 along the rail 268. In one example, the receiver 284 is received within the rail 268 and is configured to slide along the rail 268. In another example, the receiver 284 includes teeth that mesh with teeth disposed on the rail 268 and rotation of the receiver 284 moves the receiver 284 along the rail 268. However, the receiver 284 may move along the rail 268 in another suitable manner.

The suction cup 286 is disposed at the sixth end 290 of the rod 282. The suction cup 286 is configured to grasp and release the workpiece 134. The suction cup 286 may be a spring-loaded suction cup. Accordingly, a spring 292 may be disposed within the rod 282 and positioned between the receiver 284 and the suction cup 286.

Figure 8:
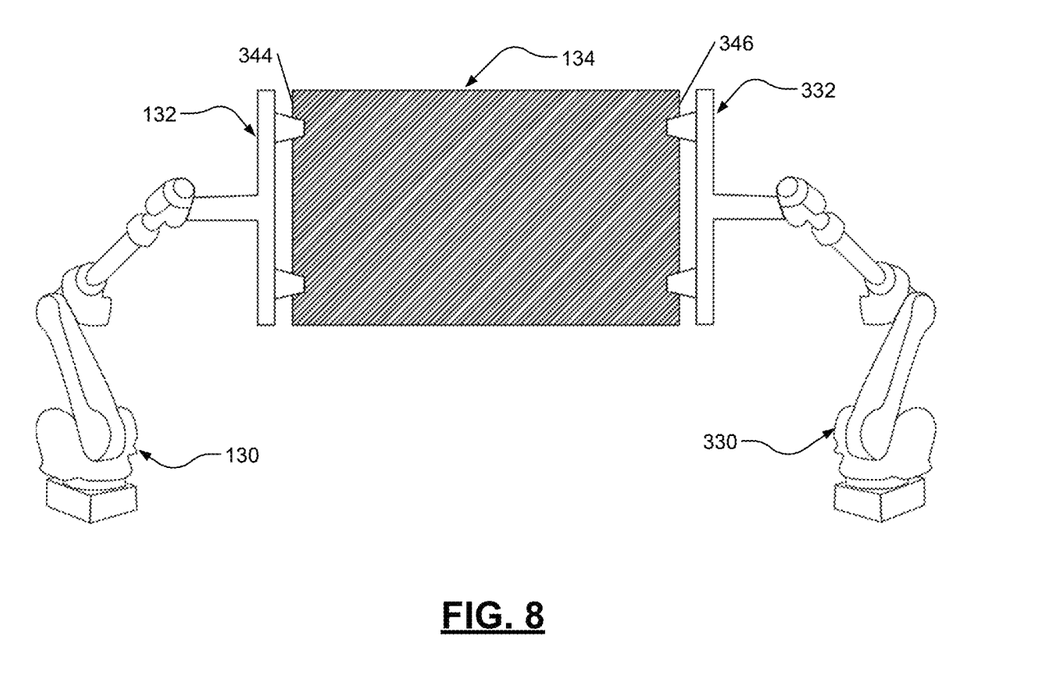
FIG. 8 is a perspective view of an example first robot attached to a first end effector and an example second robot attached to a second end effector.

In some configurations, the robotic system 100 may include two robots. FIG. 8 is a perspective view of the robot 130 attached to the end effector 132 and an example second robot 330 attached to a second end effector 332.

The second robot 330 may be the same or substantially similar to the robot 130. Similarly, the second end effector 332 may be the same or substantially similar to the end effector 132 or the end effector 232. Accordingly, the second robot 330 and the second end effector 332 will not be re-described in detail.

The robot 130 may be disposed on and grasp a first side 344 of the workpiece 134 and the second robot 330 may be disposed on and grasp a second side 346 of the workpiece 134. In the illustrated examples, the first side 344 is opposite the second side 346 such that the end effector 132 and the second end effector 332 grasps the workpiece 134 at opposing ends of the workpiece 134. However, the first side 344 may be adjacent to the second side 346 and/or positioned at any suitable angle relative to the second side 346 of the workpiece.

Figure 9:
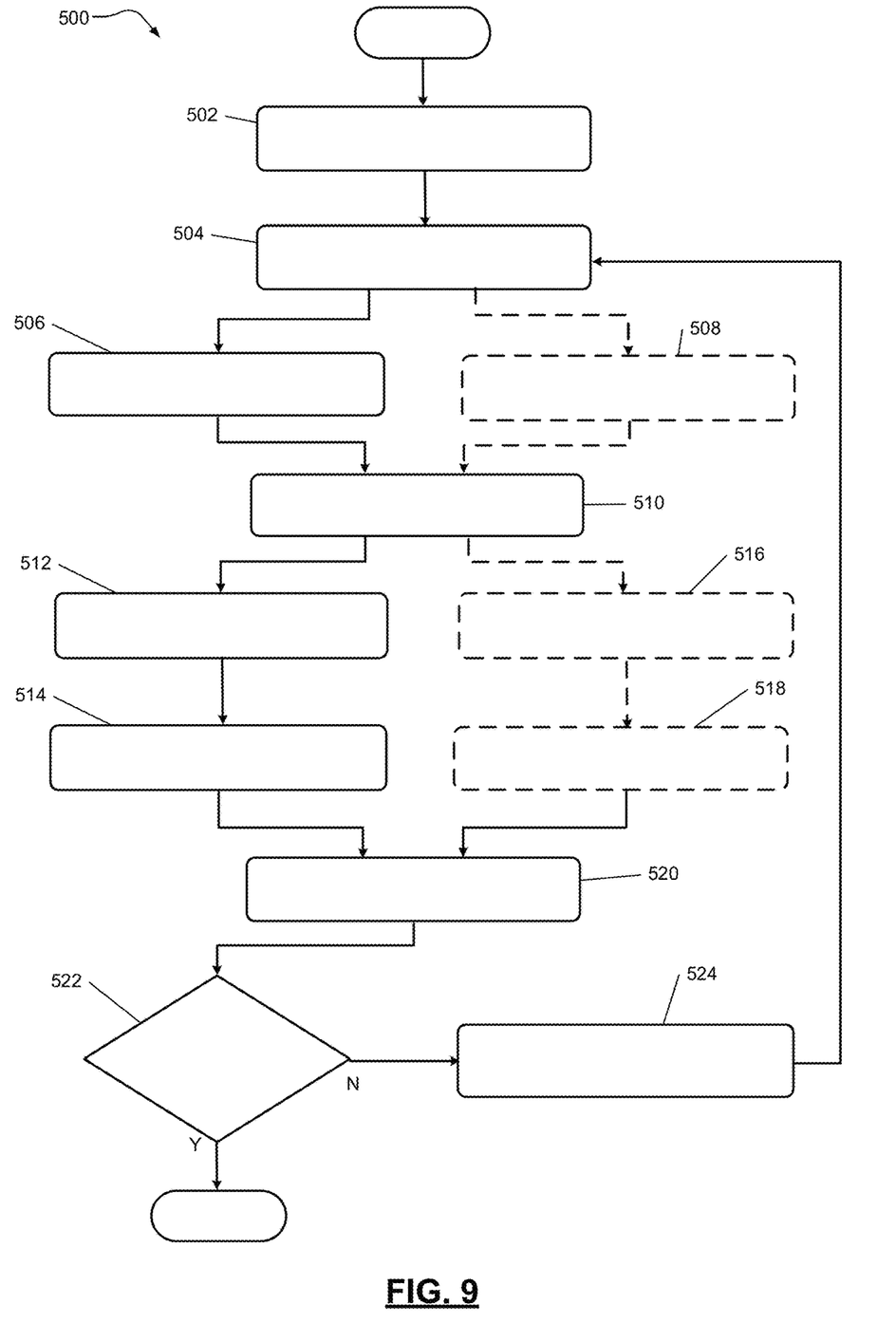
FIG. 9 is a flowchart depicting an example method of controlling an example robotic system.

FIG. 9 is a flowchart depicting an example method 500 of operating the example robotic system 100.

At 502, the control module 104 determines the path of the one or more robots 102 based on the first form (e.g., form prior to passing through the machine 109) of the workpiece 106 and the target form of the workpiece 106. The control module 104 determines the location for the at least one attachment device 122 to grasp the workpiece 106 based on the first form of the workpiece 106 and the path of the one or more robots 102. The control module 104 determines the first configuration of the end effector 108 based on the first form of the workpiece 106. The configuration of the end effector 108 is adjusted to the first configuration by the control module 104. In some examples, the control module 104 may actuate the end effector 108 and pre-stress the workpiece 106.

At 504, the control module 104 actuates the end effector 108 and grasps and holds the workpiece 106 by actuating one or more attachment devices 122 of the end effector 108.

At 506, the cameras 114 capture images of the workpiece 106. For example, the cameras 114 capture first images of the workpiece 106 (e.g., images prior to the workpiece 106 passing through the machine 109). The cameras 114 transmit the images to the first adjustment module 110. The first adjustment module 110 determines a present form of the workpiece 106 based on at least one of the images.

Optionally at 508, the force sensors 120 measure the forces applied by the one or more attachment devices 122 of the end effector 108 onto the workpiece 106 in order to grasp and hold the workpiece 106. For example, the force sensors 120 measure first forces of the workpiece 106 (e.g., forces prior to the workpiece 106 passing through the machine 109). The force sensors 120 transmit the force measurements to the second adjustment module 112. The second adjustment module 112 determines a present form of the workpiece 106 based on at least one of the force measurements.

At 510, the control module 104 controls the one or more robots 102 to pass the workpiece 106 through the machine 109 based on the determined path of the one or more robots 102. The end effector 108 continues to grasp and hold the workpiece 106. As the workpiece 106 is passed through the machine 109, the cameras 114 continue to capture images of the workpiece 106 and transmit the images to the first adjustment module 110 and optionally, the force sensors 120 continue to measure the forces and transmit the forces to the second adjustment module 112. In some examples, the control module 104 may adjust the configuration of the end effector 108 based on the present form of the workpiece 106.

At 512, the cameras 114 capture second images of the workpiece after the workpiece 106 has passed through the machine 109. Image capturing may then stop (at least temporarily). The cameras 114 transmit the second images to the first adjustment module 110.

At 514, the first adjustment module 110 determines the second form of the workpiece 106 (e.g., the form of the workpiece 106 after being passed through the machine 109) based on at least one of the second images. Additionally, the first adjustment module 110 determines the first change in the workpiece 106 based on at least one of the first images and at least one of the second images. The first adjustment module 110 transmits the second form of the workpiece 106 and the first change in the workpiece 106 to the control module 104.

Optionally, at 516, the force sensors 120 measure second forces exerted by the one or more attachment devices 122 of the end effector 108 onto the workpiece 106 after the workpiece 106 has passed through the machine 109. Force measurement may then stop (at least temporarily).

Optionally, at 518, the second adjustment module 112 determines the second form of the workpiece 106 based additionally or alternatively on at least one of the second force measurements. For example, the second adjustment module 112 determines the material stretch in the workpiece 106 based on at least one of the second force measurements and determines the second form of the workpiece 106 based on the material stretch. Additionally, the second adjustment module 112 determines the second change in the workpiece 106 based on at least one of the first force measurements and at least one of the second force measurements. For example, the second adjustment module 112 may determine the second change based on a change between the first form and the second form (determined based on the second force measurement(s)). The second adjustment module 112 transmits the second form of the workpiece 106 and the second change in the workpiece 106 to the control module 104.

At 520, the control module 104 controls the one or more attachment devices 122 of the end effector 108 and releases the workpiece 106.

At 522, the control module 104 determines whether the workpiece 106 (the present form) is in the target form by comparing the present form of the workpiece 106 with the target form of the workpiece. In some examples, the target form may be a predetermined CAD model for the workpiece 106.

If 522 is true (e.g., the workpiece 106 is in the target form), the method ends. The workpiece 106 may be ready for assembly onto a vehicle.

If 522 is false (e.g., the workpiece 106 is not in the target form), the method continues to 522. At 524, the control module 104 determines the path of the one or more robots 102 based on at least one of the second form of the workpiece 106, the first or second change in the workpiece 106, and the target form of the workpiece 106. Additionally, the control module 104 determines the second configuration of the end effector 108 based on at least one of the first and second changes in the workpiece 106. The control module 104 adjusts the configuration of the end effector 108 to the second configuration such that the second configuration is suitable for the second form of the workpiece 106.

The method 500 continues to 504, where control module 104 actuates the end effector 108 to again grasp and hold the workpiece 106 by actuating one or more attachment devices 122 of the end effector 108. The end effector 108 may grasp the workpiece 106 in the same or different location than in the previous pass through the machine 109 based on at least one of the first and second changes in the workpiece 106 and the path of the one or more robots 102 for the subsequent pass through the machine 109. The method 500 repeats until 522 is true.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic system for forming a moldable workpiece, the robotic system comprising:
  a robot configured to pass the workpiece through a machine;
  an end effector configured to be attached to the robot and configured to grasp and release the workpiece, the end effector being adjustable to a plurality of different configurations;
  an adjustment module configured to determine a change in the workpiece from (a) a first form of the workpiece prior to the passing of the workpiece through the machine to (b) a second form of the workpiece after passing of the workpiece through the machine; and
  a control module configured to adjust a present configuration of the end effector to a second configuration based on the change in the workpiece from (a) the first form to (b) the second form.

2. The robotic system of claim 1, further comprising:
  a camera configured to capture (a) a first image of the workpiece prior to the passing of the workpiece through the machine and (b) a second image of the workpiece after the passing of the workpiece through the machine,
  wherein the adjustment module is configured to determine the first form of the workpiece based on the first image and to determine the second form of the workpiece based on the second image.

3. The robotic system of claim 1, further comprising:
  at least one camera configured to capture an image of the workpiece while the workpiece is being passed through the machine,
  wherein the adjustment module is configured to determine a present form of the workpiece based on the image, and
  wherein the control module is configured to adjust the present configuration of the end effector based on the present form of the workpiece and while the workpiece is being passed through the machine.

4. The robotic system of claim 1, wherein:
  the end effector includes a force sensor configured to measure (a) a first force applied by the end effector to the workpiece prior to the passing of the workpiece through the machine and (b) a second force applied by the end effector to the workpiece after the passing of the workpiece through the machine; and
  the adjustment module is configured to determine the first form based on the first force and to determine the second form based on the second force.

5. The robotic system of claim 1, wherein:
  the end effector includes a force sensor that is configured to measure a force applied by the end effector to the workpiece as the workpiece is passed through the machine;
  the adjustment module is configured to determine a present form of the workpiece based on the force; and
  the control module is configured to adjust the present configuration of the end effector based on the present form of the workpiece while the workpiece is passed through the machine.

6. The robotic system of claim 1, wherein:
  the end effector includes:
    a support portion; and
    an attachment device that is attached to the support portion and configured to grasp and release the workpiece; and
  the control module is configured to adjust the present configuration of the end effector by adjusting the attachment device.

7. The robotic system of claim 6, wherein the control module is configured to move the attachment device in at least one of an X direction, a Y direction, and a Z direction, and the X, Y and Z directions are perpendicular to each other.

8. The robotic system of claim 6, wherein the control module is configured to rotate the attachment device about at least one of an X axis, a Y axis, and a Z axis, and the X, Y and Z axes are perpendicular to each other.

9. The robotic system of claim 6, wherein the attachment device includes a first attachment device that is movable relative to the support portion of the end effector, and the end effector further includes and a second attachment device that is fixed to the support portion.

10. The robotic system of claim 1, wherein the machine is at least one of an English wheel and a power hammer.

11. The robotic system of claim 1, further comprising:
a second robot; and
a second end effector configured to be attached to the second robot and configured to grasp and release the workpiece,
wherein the end effector and the second end effector grasp opposing ends of the workpiece.

12. A robotic system for forming a moldable workpiece, the robotic system comprising:
a robot configured to pass the workpiece through a machine;
an end effector including a support portion and an attachment device that is attached to the support portion, the attachment device being configured to grasp and release the workpiece and being adjustable to a plurality of configurations;
a camera configured to capture (a) a first image of the workpiece prior to the passing of the workpiece through the machine and (b) a second image of the workpiece after the passing of workpiece through the machine;
a first adjustment module configured to determine a change in the workpiece from (a) a first form prior to the passing of the workpiece through the machine to (b) a second form of the workpiece after passing of the workpiece through the machine using the first image and the second image; and
a control module configured to adjust a present configuration of the attachment device to a second configuration based on the change in the workpiece from (a) the first form to (b) the second form.

13. The robotic system of claim 12, wherein the end effector includes a rail fixedly attached to the support portion and the attachment device is movable along the rail.

14. The robotic system of claim 12, wherein the attachment device is a suction cup that is spring-loaded.

15. The robotic system of claim 12, wherein:
the attachment device includes a housing and a pair of fingers that extend from the housing; and
the control module is configured to actuate the pair of fingers and grasp and release the workpiece.

16. The robotic system of claim 12, wherein the control module is configured to actuate the attachment device to release the workpiece after the passing of the workpiece through the machine and configured to re-grasp the workpiece prior to a subsequent passing of the workpiece through the machine.

17. The robotic system of claim 12, further comprising:
a second adjustment module,
wherein the end effector includes a force sensor configured to measure (a) a first force applied by the attachment device to the workpiece prior to the passing of the workpiece through the machine and (b) a second force applied by the attachment device to the workpiece after the passing of the workpiece through the machine, and
wherein the second adjustment module is configured to determine the first form based on the first force and to determine the second form based on the second force.

18. The robotic system of claim 17, wherein:
the second adjustment module is configured to determine a second change in the workpiece from (a) the first form to (b) the second form; and
the control module is configured to adjust the present configuration of the attachment device based on at least one of the change and the second change in the workpiece.

19. The robotic system of claim 12, further comprising:
a second robot; and
a second end effector configured to be attached to the second robot and configured to grasp and release the workpiece,
wherein the end effector and the second end effector grasp opposing ends of the workpiece.

20. A robotic system method for forming a moldable workpiece, the robotic system method comprising:
capturing a first image of a workpiece prior to passing of the workpiece through a machine;
determining a first form of the workpiece prior to the passing of the workpiece through the machine based on the first image;
passing the workpiece through the machine using an end effector;
capturing a second image of the workpiece after the passing of the workpiece through the machine;
determining a second form of the workpiece after passing of the workpiece through the machine based on the second image;
determining a change in the workpiece from (a) the first form to (b) the second form; and
adjusting a present configuration of the end effector to a second configuration based on the change in the workpiece from (a) the first form to (b) the second form.

* * * * *